United States Patent
Hou et al.

(10) Patent No.: US 11,892,586 B2
(45) Date of Patent: Feb. 6, 2024

(54) INTERPRETATION OF DIELECTRIC TOOL MEASUREMENTS USING GENERAL MIXING LAWS

(71) Applicant: Halliburton Energy Services, Inc., Houston, TX (US)

(72) Inventors: Junsheng Hou, Houston, TX (US); Baris Guner, Houston, TX (US); Ahmed Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 17 days.

(21) Appl. No.: 17/572,686

(22) Filed: Jan. 11, 2022

(65) Prior Publication Data

US 2023/0221456 A1 Jul. 13, 2023

(51) Int. Cl.
| | |
|---|---|
| *G01V 3/32* | (2006.01) |
| *G01V 3/38* | (2006.01) |
| *E21B 47/07* | (2012.01) |
| *E21B 47/04* | (2012.01) |
| *G01V 3/08* | (2006.01) |
| *E21B 49/08* | (2006.01) |

(52) U.S. Cl.
CPC ................ *G01V 3/32* (2013.01); *E21B 47/04* (2013.01); *E21B 47/07* (2020.05); *G01V 3/38* (2013.01); *E21B 49/087* (2013.01); *G01V 3/08* (2013.01)

(58) Field of Classification Search
None
See application file for complete search history.

(56) References Cited

U.S. PATENT DOCUMENTS

| | | | |
|---|---|---|---|
| 9,335,433 B2 | 5/2016 | Li et al. | |
| 2016/0061803 A1 | 3/2016 | Hadj-Sassi et al. | |
| 2017/0167256 A1 | 6/2017 | Torres | |
| 2018/0120468 A1 | 5/2018 | Seleznev et al. | |
| 2018/0275307 A1 | 9/2018 | Pan et al. | |
| 2018/0321412 A1 | 11/2018 | Wang et al. | |
| 2018/0372906 A1 | 12/2018 | Hou et al. | |
| 2019/0204466 A1* | 7/2019 | Zhang | G01V 3/30 |
| 2021/0010367 A1 | 1/2021 | Seleznev et al. | |

OTHER PUBLICATIONS

International Search Report and Written Opinion for Application No. PCT/US2022/011918, dated Sep. 27, 2022.
Bittar et al., "A Modern Microwave Formation Evaluation Sensor and Its Applications in Reservoir Evaluation," SPWLA 51$^{st}$ Annual Logging Symposium, Perth, Australia, Jun. 19-23, 2010.
Donadille et al., "Water Complex Permittivity Model for Dielectric Logging," SPE Middle East Oil & Gas Show and Conference, Manama, Bahrain, Mar. 8-11, 2015.

(Continued)

*Primary Examiner* — Douglas X Rodriguez
(74) *Attorney, Agent, or Firm* — John Wustenberg; C. Tumey Law Group PLLC

(57) ABSTRACT

Methods for determining water-filled porosity using a general volumetric mixing law and the measurements of a dielectric tool are described. The water-filled porosity estimates are used to obtain water salinity estimates and the optimal parameters of the volumetric mixing law. These estimates are in turn used to generate novel quality indicators.

17 Claims, 7 Drawing Sheets

(56) References Cited

OTHER PUBLICATIONS

Hizem et al., "Dielectric Dispersion: A New Wireline Petrophysical Measurement," SPE Annual Technical Conference and Exhibition, Denver, Colorado, USA, Sep. 21-24, 2008.
Klein et al., "An Improved Model for the Dielectric Constant of Sea Water at Microwave Frequencies," IEEE Transaction on Frequencies, Antennas and Propagation, vol. 25, No. 1, pp. 104-111.
Ramakrishna et al., "Mineralogy, Porosity, and Fluid Property Determination of Oil Reservoirs of the Green River Formation in the Uinta Basin," SPWLA $53^{rd}$ Annual Logging Symposium, Cartagena, Colombia, Jun. 16-20, 2012.
Stogryn, "Equations for Calculating the Dielectric Constant of Saline Water," IEEE Transaction on Microwave Theory and Techniques, vol. 19, Aug. 1971, pp. 733-736.
Stroud et al., "Analytical Model for the Dielectric Response of Brine-Saturated Rocks," Physical Review B, vol. 34, No. 8, Oct. 1986, pp. 5145-5153.

\* cited by examiner

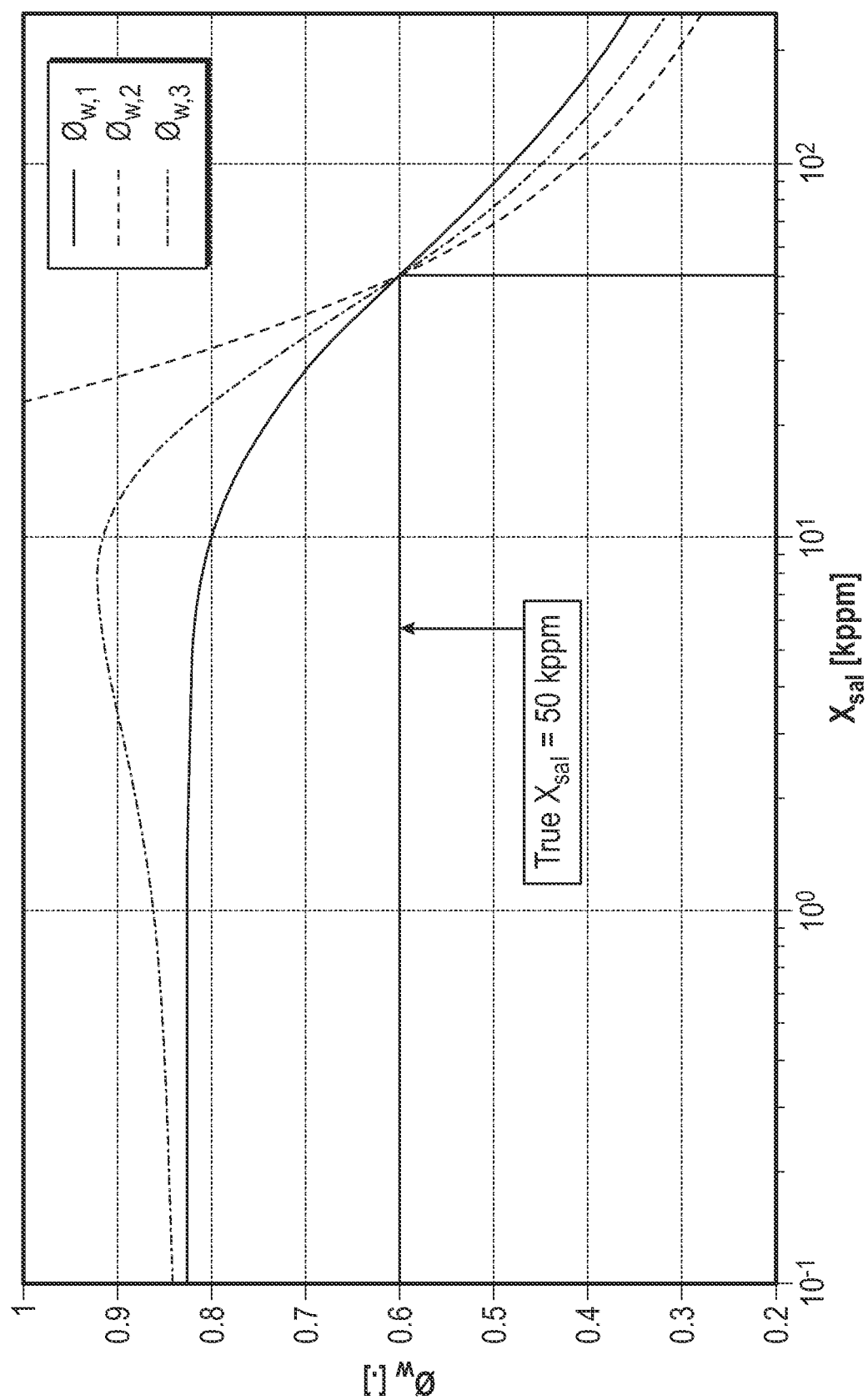

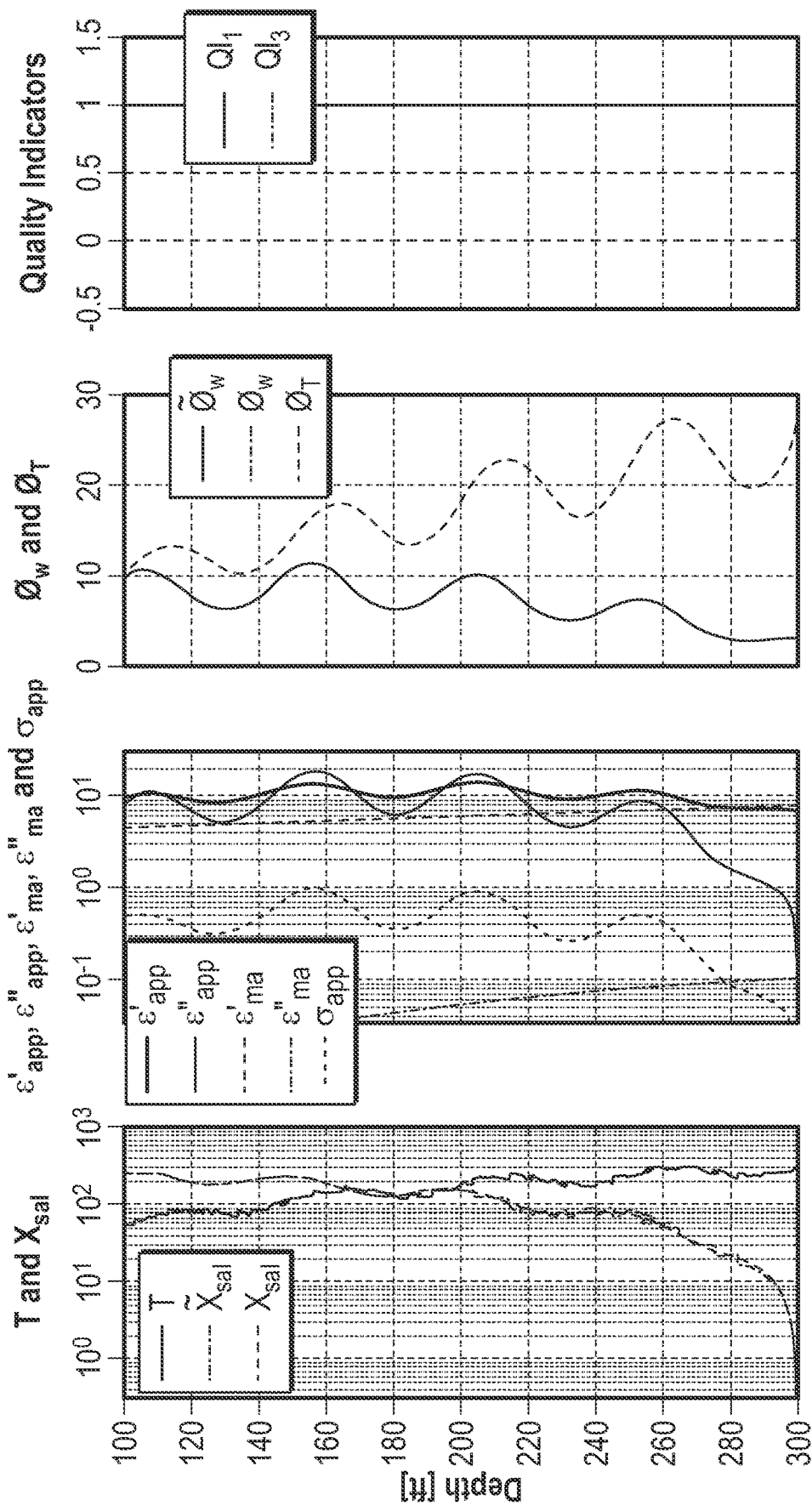

INTERPRETATION OF DIELECTRIC TOOL MEASUREMENTS USING GENERAL MIXING LAWS

FIELD OF THE INVENTION

The present invention relates generally to hydrocarbon exploration and, more specifically, to methods and systems to determine water-filled porosity using volumetric mixing laws and the measurements of a dielectric tool.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging, "logging while drilling" (LWD), drill pipe conveyed logging, and coil tubing conveyed logging. A variety of logging tools are available for use with each of these methods.

One example of an available wireline logging and LWD tool is a dielectric tool. Such tools determine the dielectric constant and conductivity of downhole formations from the real and imaginary parts of the complex propagation constant of electromagnetic waves traveling through the formations. The dielectric tool measurements may be used in accordance with the Complex Refractive Index Method ("CRIM") mixing law to obtain an estimation of the water-filled formation porosity. However, conventional applications of this mixing law have implicit assumptions that may lead to inaccurate and/or limited analysis of formation porosity.

BRIEF DESCRIPTION OF THE DRAWINGS

FIG. 2 is a graph of water salinity using three water-filled porosity estimates vs the water salinity;

FIGS. 5a, b, c and d are results of FIG. 4 reproduced after an introduction of a 10% random error in temperature;

DESCRIPTION OF ILLUSTRATIVE EMBODIMENTS

Figure 1A:
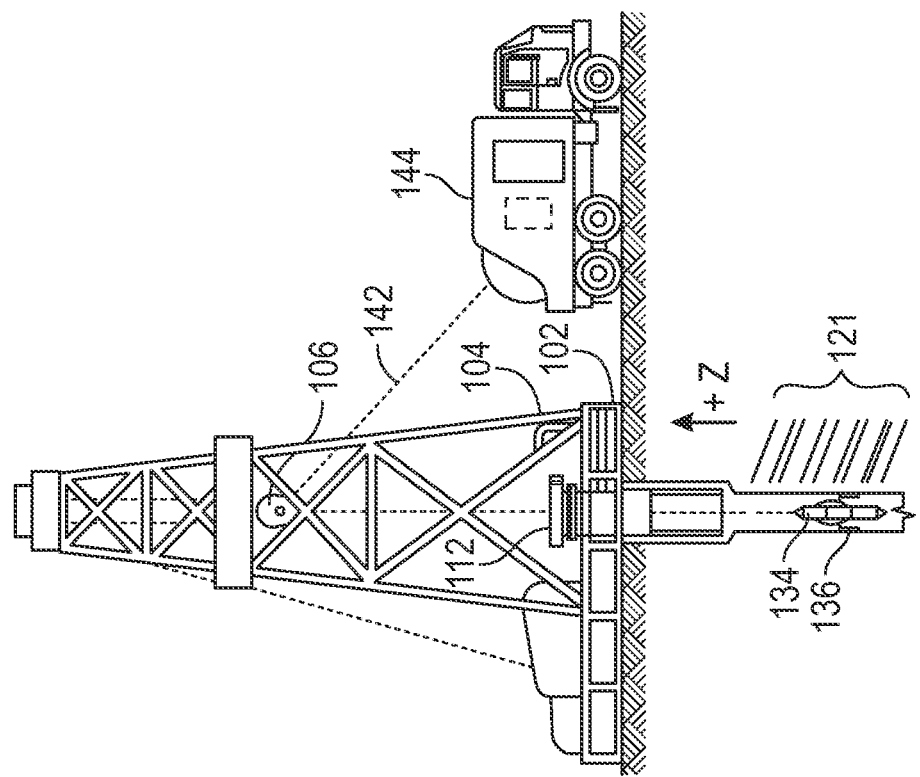
FIG. 1A is a schematic diagram of a logging while drilling (LWD) environment of the present disclosure.

Illustrative embodiments and related methods of the present disclosure are described below as they might be employed to determine water-filled porosity using a volumetric mixing law and water salinity. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Exemplary embodiments of the present invention are directed to systems and methods to determine water-filled porosity using a general mixing law. The only assumption for the mixing law is that the water, hydrocarbon and matrix components mix in proportion to their volumetric ratios. The resulting porosity values are then used to determine the water salinity and the parameters of the mixing law model. As an example, model parameters may be the optimum power that should be used in a power-based mixing law. Quality of the measurements may also be quantified using the estimated water porosities. Thus, the presented illustrative methods have the capability to increase the accuracy of the answer products for the dielectric tool and produce novel information beneficial for end users. Possible extensions to multi-frequency operation and imaging applications are also provided herein, as well as methods to improve data quality.

A generalized method of the present disclosure calculates, using real measurements obtained by the dielectric tool, a first estimate of water-filled porosity. A second estimate of water-filled porosity is calculated using imaginary measurements obtained by the dielectric tool. A third estimate of water-filled porosity is also calculated using complex measurements (combined real and imaginary parts) obtained by the dielectric tool. Thereafter, values of volumetric mixing law parameters and water salinity that minimize a difference between at least two of the first, second or third estimates of water-filled porosity are then calculated. As a result, optimal values of water salinity and the volumetric mixing law parameter are obtained and, thereafter, used to calculate water-filled porosity.

As previously mentioned, the CRIM mixing law has been used to determine water-filled porosity for the dielectric tool. Although CRIM has been shown to be highly accurate in the operational range of the dielectric tool, the conventional application of the law has proven limited in its accuracy. In the present disclosure, however, the methods described herein increase the accuracy by applying different mixing laws. In this disclosure, it is shown through use of any volumetric mixing law and the complex measurements from the dielectric tool, one can determine three separate estimates of water-filled porosity. These estimates are then used to determine the water salinity, as well as the parameters of the volumetric mixing law. Exponential coefficients of power-based mixing laws (for which CRIM is one example case) is an example of such a parameter. Furthermore, final porosity estimates may also be used to quantify the quality of the measurements.

An illustrative logging while drilling (LWD) environment of the present disclosure is shown in FIG. 1A. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of the drill string 108 are connected by threaded connectors 107. Connected to the lower end of the drill string 108 is a drill bit 114. As bit 114 rotates, it creates a borehole 120 that passes through various formations 121. A pump 116 circulates drilling fluid through a supply pipe 118 to top drive 110, downhole through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

As shown in FIG. 1A, the drill string 108 can support several components along its length. In wells employing MWD or LWD, a sensor unit 126 (logging tool) collects data regarding the formation properties and/or various drilling parameters near the drill bit 114. The collected data can include such properties as formation fluid density, temperature, pressure, resistivity, porosity, and azimuthal orientation of the drill bit 114 or drill string 108. Other sensor units can be disposed along the drill string 108 which can be similarly enabled to sense nearby characteristics and conditions of the drill string 108, formation fluid, and surrounding formation. Regardless of which conditions or characteristics are sensed, data indicative of those conditions and characteristics is either recorded downhole, for instance at a processor within sensor unit 126 for later download, or communicated to the surface either by mud pulse telemetry, wire, wirelessly or otherwise. Power for the sensor units and communication module may be provided by batteries housed therein. Alternatively, power may be generated from the flow of drilling mud through the drill string 108 using turbines as is known in the art.

The sensor unit 126 can be coupled to a controller/communication module 128 that can transmit the collected data to the surface via a communication path. Alternatively, sensor unit 126 and communication module 128 can receive signals from the surface or can transmit/receive data to or from other sensor units and communication modules disposed along the drill string 108. In wells employing mud pulse telemetry, communication module 128 can modulate the resistance to the incoming flow of drilling fluid to generate pressure pulses (positive/negative pulse systems) or a carrier frequency (continuous wave pulse system) that propagate to the surface. In such mud pulse telemetry systems, communication module 128 forms part of a mud pulser that generates the pulse waveforms using, for example, an electric motor. Various transducers can convert the pressure signal into electrical signals for a signal digitizer (e.g., an analog to digital converter). The digitizer supplies a digital form of the pressure signals to one or more processor or some other data processing device. The Processor operates in accordance with software (which may be stored on a computer-readable storage medium) to process and decode the received signals.

Figure 1B:
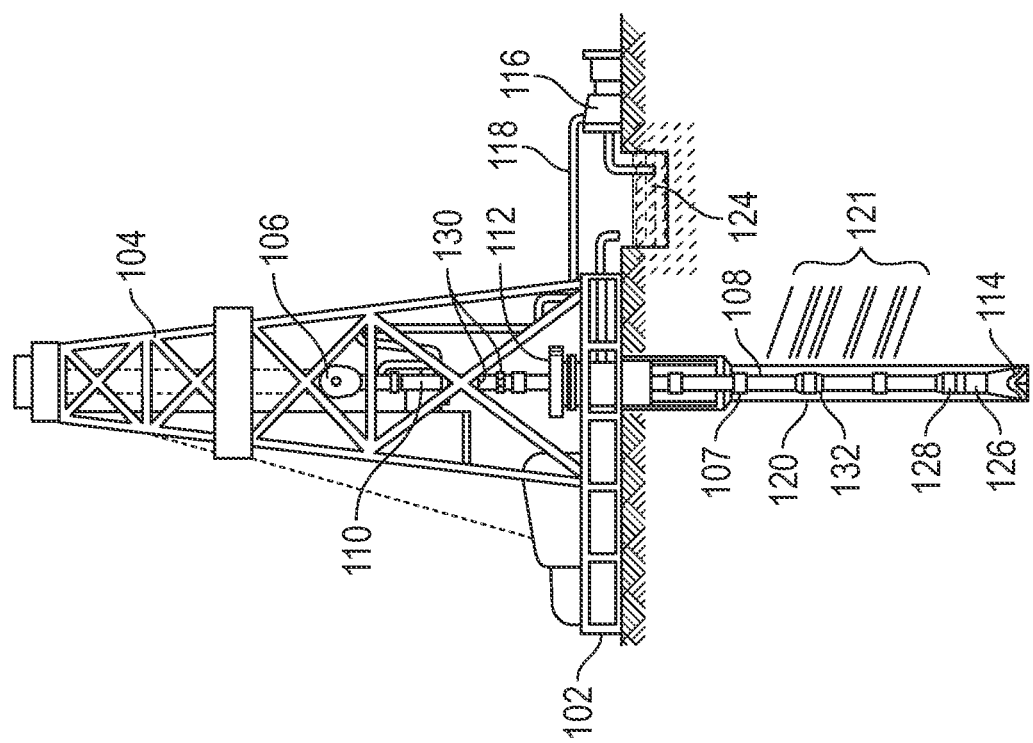
FIG. 1B is a schematic diagram of a wireline environment of the present disclosure.

At various times during the drilling process, the drill string 108 is removed from the borehole as shown in the wireline application of FIG. 1B. In this example, once the drill string has been removed, logging operations can be conducted using a wireline logging tool 134, i.e., a sensing instrument sonde suspended by a cable 142 having conductors for transporting power to the tool and telemetry from the tool to the surface. A resistivity imaging portion of the logging tool 134 may have centralizing arms 136 that center the tool within the borehole as the tool is pulled uphole. A logging facility 144 collects measurements from the logging tool 134, and includes computing facilities for processing and storing the measurements gathered by the logging tool.

FIG. 1A and FIG. 1B show formations 121 that are not perpendicular to the borehole, a situation that may occur naturally or may occur due to directional drilling operations.

The logging tools used in these environments may include, for example, a dielectric tool. Dielectric logging tools are particularly important for evaluating high-resistivity reservoirs (e.g., carbonate formations) and unconventional reservoirs (e.g., shale.) Dielectric tools are used to determine water-filled porosity and water salinity. These parameters may in turn be used to determine water saturation, water resistivity and the cementation exponent (m) in Archie's Law.

One example of a dielectric tool is the HFDT of Halliburton Energy Services, Inc. of Houston Texas This tool measures the attenuation and phase of the electromagnetic signal propagating near the borehole wall at GHz frequencies. Horn antennas may be used to transmit and receive electromagnetic waves. HFDT is a pad-type tool that has two transmitters and three receivers. As a result, the HFDT may make measurements at multiple depths of investigation. However, these measurements are from a single azimuthal location for a given depth point. Therefore, HFDT does not provide full azimuthal coverage.

For determining the real part of the apparent dielectric constant and apparent resistivity from the attenuation and phase measurements, a mapping algorithm may be used. The term "apparent" here denotes this quantity is what is being measured by the tool and may not directly correspond to the properties of a single material (such as water or the rock matrix). The apparent complex dielectric constant $\varepsilon_{app}^*$ may then be obtained as:

$$\varepsilon_{app}^* = \varepsilon_{app}' + i\frac{1}{\omega\varepsilon_0\sigma_{ap}}, \qquad \text{Eq. 1}$$

where $\omega$ is the angular frequency, $\varepsilon_0$ is the permittivity of the free space, and $\sigma_{ap}$ is the apparent conductivity at the operating frequency of the tool. As mentioned above, the apparent complex dielectric constant ($\varepsilon_{ap}^*$) may not correspond to the dielectric constant of a particular material and it may in general be a function of multiple variables, which may include the following as shown in Equation 2 below: complex dielectric constant of the rock matrix ($\varepsilon_{ma}^*$), water-filled porosity ($\phi_w$), complex dielectric constant of water ($\varepsilon_w^*$), complex dielectric constant of the hydrocarbons in the formation ($\varepsilon_{hc}^*$), total porosity ($\phi_T$) and the textural parameters such as the mn texture exponent which will be described below.

$$\varepsilon_{app}^* = M(\varepsilon_{ma}^*, \phi_w, \varepsilon_w^*, \varepsilon_{hc}^*, \phi_T, mn, \ldots) \qquad \text{Eq. 2,}$$

where M denotes the mixing law.

A number of rock-physics interpretation models are useful for relating the apparent complex permittivity to these aforementioned variables. One such model is the CRIM model. Other models include, for example, the complex time average (CTA) model, and the TPO model. CRIM model is shown to be highly accurate in the GHz range, as discussed in Hizem et al, Dielectric dispersion: A new wireline petrophysical measurement, SPE-116130, 2008.

Using the CRIM model, $\varepsilon_{app}^*$ may be expressed as follows:

$$\sqrt{\varepsilon_{app}^*} = \phi w \sqrt{\varepsilon w^*} + (1-\phi_T)\sqrt{\varepsilon_{ma}^*} + (\phi T - \phi w)\sqrt{\varepsilon_{hc}^*} \qquad \text{Eq. 3}$$

In certain embodiments, some of the parameters in Equation 3 may be known through other means. For example, $\phi_T$ may be obtained from nuclear (density/neutron) or NMR logs. Furthermore, complex permittivity of the water may be modeled as a function of water salinity ($X_{sal}$), pressure (P), and temperature (T) as shown in Equation 4 below. One such model is the SMD model.

$$\varepsilon_w^* = (T, X_{sal}, P) \qquad \text{Eq. 4,}$$

where W represents the model for the complex permittivity of the water.

Equation 3 provides two equations (for real and imaginary parts of the complex numbers) for two unknowns ($\phi_w$ and $X_{sal}$), assuming all the other unknowns are available through supplemental measurements. These two equations may be solved to resolve the two unknowns.

In view of the foregoing, an illustrative method of the present disclosure applies the CRIM model given in Eq. 3 as one embodiment of a general power-based mixing law given below:

$$(\varepsilon_{app}^*)^\alpha = \phi_w(\varepsilon_w^*)^\alpha + (1-\phi_T)(\varepsilon_{ma}^*)^\alpha + (\phi_T - \phi_w)(\varepsilon_{hc}^*)^\alpha \qquad \text{Eq. 5,}$$

where $\alpha$ is a mixing law (model) parameter.

To take this one step further, Equation 5 may be further generalized to:

$$F(\varepsilon_{app}^*) = \phi_w F(\varepsilon_w^*) + (1-\phi_T)F(\varepsilon_{ma}^*) + (\phi_T - \phi_w)F(\varepsilon_{hc}^*) \qquad \text{Eq. 6,}$$

where F denotes a function whose input is a permittivity. Equation 6 represents a volumetric mixing law where the apparent permittivity measurement is affected by the water, matrix and hydrocarbon components in proportion to their volume. The techniques developed in this disclosure may be applied to any such mixing law where the measured permittivity is linearly proportional to the water and total porosities as given by Equation 6.

The function F in Equation 6 may be thought as giving an effective refractive index of the material. In general, this effective refractive index is complex and may be written as follows:

$$F(\varepsilon^*) = n^* = n' + i n'' \qquad \text{Eq. 7,}$$

where n* is the complex refractive index, n' is the real part of the refractive index, n" is the imaginary part of the refractive index and $i = \sqrt{-1}$.

Water saturation $S_{xo}$ is defined as the ratio of the water-filled porosity to the total porosity as given in Equation 8.

$$S_{xo} = \frac{\phi_w}{\phi_T} \qquad \text{Eq. 8}$$

Using Equation 8, Equation 6 Eq. 8 may be modified as follows:

$$F(\varepsilon_{app}^*) = S_{xo}\phi_T F(\varepsilon_w^*) + (1-\phi_T)F(\varepsilon_{ma}^*) + (\phi_T - S_{xo}\phi_T)F(\varepsilon_{hc}^*) \qquad \text{Eq. 9}$$

Thus, $$S_{xo} = \frac{F(\varepsilon_{app}^*) + (\phi_T - 1)F(\varepsilon_{ma}^*) - \phi_T F(\varepsilon_{hc}^*)}{\phi_T(F(\varepsilon_w^*) - F(\varepsilon_{hc}^*))} \qquad \text{Eq. 10}$$

Or $$\phi_w = \frac{F(\varepsilon_{app}^*) + (\phi_T - 1)F(\varepsilon_{ma}^*) - \phi_T F(\varepsilon_{hc}^*)}{(F(\varepsilon_w^*) - F(\varepsilon_{hc}^*))} \qquad \text{Eq. 11}$$

Equation 11 may be rewritten using Equation 7:

$$\phi_w = \frac{n'_{app} + i n''_{app} + (\phi_T - 1)(n'_{ma} - i n''_{ma}) - \phi_T(n'_{hc} + i n''_{hc})}{((n'_w + i n''_w) - (n'_{hc} - i n''_{hc}))} \qquad \text{Eq. 12}$$

Equation 12 should hold for both real and imaginary parts separately, thus, it can be written:

$$\phi_{w,1} = \frac{n'_{app} + (\phi_T - 1)n'_{ma} - \phi_T n'_{hc}}{(n'_w - n'_{hc})} \qquad \text{Eq. 13}$$

$$\phi_{w,2} = \frac{n''_{app} + (\phi_T - 1)n''_{ma} - \phi_T n''_{hc}}{(n''_w - n''_{hc})} \qquad \text{Eq. 14}$$

Where $\phi_{w,1}$ denotes the first water-filled porosity equation obtained using the real part of the refractive indices and $\phi_{w,2}$ denotes the second water-filled porosity equation obtained using the imaginary part of the refractive indices.

Finally, Equation 12 can be rewritten in complex form as follows:

$$\phi_w = \frac{\left((n'_{app} + (\phi_T - 1)n'_{ma} - \phi_T n'_{hc}) + i(n''_{app} + (\phi_T - 1)n''_{ma} - \phi_T n''_{hc})\right)}{\left((n'_w - n'_{hc}) + i(n''_w - n''_{hc})\right)} \left((n'_w - n'_{hc})^2 + (n''_w - n''_{hc})^2\right) \qquad \text{Eq. 15}$$

Since water-filled porosity must be a real quantity, imaginary components of Equation 15 may be removed to write:

$$\phi_{w,3} = \frac{(n'_{app} + (\phi_T - 1)n'_{ma} - \phi_T n'_{hc})(n'_w - n'_{hc}) - (n''_{app} + (\phi_T - 1)n''_{ma} - \phi_T n''_{hc})(n''_w - n''_{hc})}{\left((n'_w - n'_{hc})^2 + (n''_w - n''_{hc})^2\right)} \qquad \text{Eq. 16}$$

$\phi_{w,3}$ is the third water-filled porosity equation using both real and imaginary parts of the data (complex measurement data). All three equations for water-filled porosity were derived from the same basic equation and thus should give the same result. In fact, setting $\phi_{w,1} = \phi_{w,2}$ automatically satisfies imaginary part of Equation 15 to be zero. However, in practice, noise and inaccuracies in measurements lead to differences in water-filled porosity estimates obtained from these three equations.

In view of the foregoing, a discussion of the model parameter solutions, water salinity and water-filled porosity will now be provided. An example of a model parameter may be, for example, $\alpha$ in Equation 5. In this illustrative embodiment, parameters of the model F along with Water Salinity ($X_{sal}$, which in turn affects $n_w^*$) may be solved in an inversion whose cost function includes a measure of difference between $\phi_{w,1}$, $\phi_{w,2}$ and $\phi_{w,3}$. In such an inversion, more than a single point may be used to increase accuracy, reduce noise and to solve for the additional degrees of freedom in the parameters of the model F. In such inversions, model parameters and water salinity may be assumed to be non-varying between different measurement points. An example of a cost function may then be:

$$\|\overline{\phi}_{w,1} - \overline{\phi}_{w,2}\|_2 + \|\overline{\phi}_{w,1} - \overline{\phi}_{w,3}\|_2 + \|\overline{\phi}_{w,2} - \overline{\phi}_{w,3}\|_2 \qquad \text{Eq. 17,}$$

where overbars denote the quantities are vectors and double bars with subscript 2 denote the L2 norm of the quantity within the double bars. It can be appreciated that many variations to the cost function in Equation 17 exist. In other examples, other measure of differences such as the absolute value may be used instead of the L2 norm. Just 2 of the 3 water-filled porosity estimates may be used in the cost-function. In such cases, difference of these 2 porosity estimates with the third may be constrained to a maximum value. Here, values of the volumetric mixing law parameters and water salinity which minimize the difference between two or more of the water-filled porosity estimates are calculated (these values may be referred to as optimal water salinity and optimal mixing law parameters).

Similarly, water salinity and model parameters may be constrained. For example, water salinity may be constrained to be between 0.1 kppm and 250 kppm and if the power-based mixing law of Equation 5 is used, a may be constrained to be between −1 and 1. In some cases, regularization terms may be included in the cost function based on a priori information or constraints. Inversion may be handled iteratively. Algorithms that exist in literature such as, for example, the Levenberg-Marquardt method may be used for this purpose.

A simple example illustrating the above procedure for an ideal case is shown in FIG. 2, which is a graphical solution of water salinity using three water-filled porosity estimates vs the salinity. In this case, a simple graphical solution suffices and there is no need for an inversion. A power-mixing law with α=0.5 (e.g., CRIM method) is assumed. This plot shows water salinity ($X_{sal}$) to be 50 kppm and $\varnothing_w$=0.6.

Next, calculation of a final water-filled porosity estimate will be discussed. In this example, the final water-filled porosity estimate may be selected as a weighted average of at least two of the porosity estimates found in Equation 13, Equation 14 and Equation 16. Weights may be selected based on the noise level of the tool for the real and imaginary measurements.

In other examples, an inversion may be performed. This inversion may use water salinity and model parameters as found in the previous section as fixed, known constants. Then, the inversion cost function may be the difference between the measured effective apparent refractive index and modeled effective apparent refractive index:

$$\|\bar{n}_{app}' - \tilde{n}_{app}'(\bar{\varnothing}_w)\|_2 + \|\bar{n}_{app}'' - \tilde{n}_{app}''(\bar{\varnothing}_w)\|_2 \qquad \text{Eq. 18,}$$

where the tilde sign denotes the calculated quantity based on the model for a given water-filled porosity estimate. Thus, $\bar{n}_{app}'$ is the real part of the measured effective apparent refractive index, $\tilde{n}_{app}'$ is the real part of the modeled effective apparent refractive index, $\bar{n}_{app}''$ is the imaginary part of the measured effective apparent refractive index, and $\tilde{n}_{app}''$ is the imaginary part of the modeled effective apparent refractive index. The inversion process may determine the water-filled porosity estimate that minimizes the cost-function given in Equation 18. As previously discussed, there may be many variations to how the inversion is performed and cost function is constructed, such 1o as the possibility of the addition of regularization terms. In other examples, the cost function may include a difference between just the real parts of the apparent refractive indices, a difference between just the imaginary parts of the apparent refractive indices or a difference between the complex valued apparent refractive indices. Water-filled porosity may be constrained by the total porosity (and 0) in such an inversion. Thus, in this example, the final estimate of the water-filled porosity is based on a fit of the mixing law to at least one or two of the real, imaginary or complex measurements using the optimal water salinity and mixing law parameters.

In an alternative implementation, an inversion may be performed to solve for model parameters, water salinity and water-filled porosity simultaneously. In such an implementation, the cost function given in Equation 18 may be modified to include additional variables of model parameters and water-salinity as arguments of $\tilde{n}_{app}'$ and $\tilde{n}_{app}''$. This is illustrated in Equation 19 where $\bar{X}_{sal}$ represents the water salinity vector and indicates that this value may also be assumed to be changing with logging location in some implementations while $\bar{P}$ indicates the parameters of the volumetric mixing model. Thus, in this example, an inversion is applied to the complex measurements of the dielectric tool to solve for water-filled porosity, water salinity and the parameters of the volumetric mixing model simultaneously.

$$\|\bar{n}_{app}' - \tilde{n}_{app}'(\bar{\varnothing}_w, \bar{X}_{sal}, \bar{P})\|_2 + \|\bar{n}app'' - \tilde{n}_{app}''(\bar{\varnothing}_w, \bar{X}_{sal}, \bar{P})\|_2 \qquad \text{Eq. 19,}$$

In yet other illustrative embodiments, quality indicators are used to indicate the accuracy of the water-filled porosity estimates. Here, porosity estimates as defined in Equations 13, 14 and 16 are used to define a quality indicator for dielectric logs. One example implementation of such a quality indicator may be as follows where the quality indicator is based upon a normalized difference between the first, second and third estimates of the water-filled porosity:

$$QI_1 = 1 - \frac{|\varnothing_{w,1} - \varnothing_{w,2}| + |\varnothing_{w,1} - \varnothing_{w,3}| + |\varnothing_{w,2} - \varnothing_{w,3}|}{\varnothing_{w,1} + \varnothing_{w,2} + \varnothing_{w,3}}, \qquad \text{Eq. 20}$$

When all three porosity estimates are equal, $QI_1$ takes its maximum value of 1. Thus, deviation from 1 indicates a lower data quality.

Equation 4 above showed that the water permittivity is related to water salinity through a water model W. There are many such water models which exist, such as the aforementioned SMD model, Stogryn model, Klein-Swift model and Donadille-Faivre model. The value of the estimated $X_{sal}$ depends on the selected water model W. A second quality indicator may be based on comparing the different water salinity estimates obtained from different water models. For example, Equation 21 may be used for this purpose. In this equation, index i denotes the estimate for water salinity from the $i^{th}$ water model. It is assumed that there are N such models. $QI_2$ also has a maximum value of 1 indicating the best quality.

$$QI_2 = 1 - \frac{\sum_{i=1}^{N} \left| X_{sal}^{(i)} - \frac{1}{N} \sum_{i=1}^{N} X_{sal}^{(i)} \right|}{\frac{1}{N} \sum_{i=1}^{N} X_{sal}^{(i)}}. \qquad \text{Eq. 21}$$

A third quality index may be based on the cost function of Equation 18. In Equation 22, $\tilde{n}_{app}'$ and $\tilde{n}_{app}''$ denote the real and imaginary part of the modeled estimate using the final estimated parameters (including model parameters, water-filled porosity and water salinity.) As before, a deviation from 1 for $QI_3$ indicates a lower data quality.

$$QI_3 = 1 - \frac{\|\bar{n}_{app}' - \tilde{n}_{app}'\|_2 + \|\bar{n}_{app}'' - \tilde{n}_{app}''\|_2}{\|\bar{n}_{app}'\|_2 + \|\bar{n}_{app}''\|_2}. \qquad \text{Eq. 22}$$

Thus, using the foregoing, quality indicators may be based upon a normalized difference between the first, second and third estimates of the water-filled porosity as in Eq. 20. In an alternate embodiment, the quality indicator is based upon a fit of the real, imaginary or complex measurements to the volumetric mixing law with a final estimate of the water-filled porosity and optimal water salinity as inputs, using Equation 22. In another embodiment, a quality indicator may be based upon equating the obtained dielectric tool measurements to different models for permittivity of the water (or equivalently refractive index of water) to obtain different water salinity estimates. Those different estimates may then be compared, and the quality of the water salinity estimates may be determined based upon a deviation from the mean of the estimates (using Equation 21.).

In yet other embodiments, all three quality indicators may be output to the end user separately or a weighted average of these quality indicators may be returned to the user as a final output. It should also be noted that the above quality indicators are provided to demonstrate their implementation. These equations may be modified to obtain a variety of other similar quality indicators.

Figure 3:
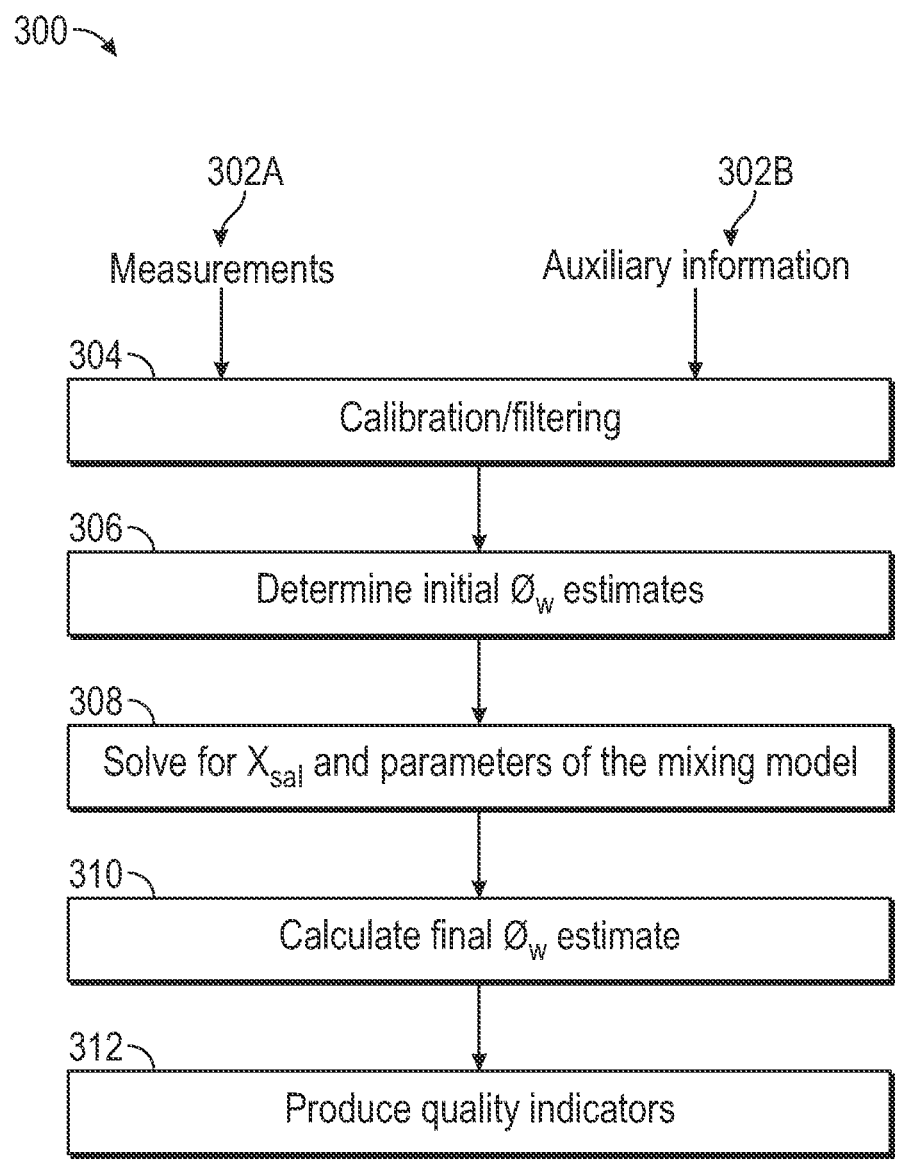
FIG. 3 is a flow chart of a workflow for an illustrative method of the present disclosure.

In view of the foregoing, FIG. 3 is a flow chart of a workflow for an illustrative method 300 of the present disclosure. In this example workflow, complex dielectric tool measurements 302A along with any auxiliary data (such as total porosity, matrix and hydrocarbon permittivities, temperature etc.) 302B are taken as inputs. This data may be subjected to calibration and filtering operations to make the measurements better match the models, smoothen the data and reduce noise, at block 304. For example, averaging or median filters may be applied to the input data. In the next block 306, initial water-filled porosity estimates are determined. These estimates are then used to find optimal water salinity and parameters of the mixing law, at block 308. In the next block 310, a final water-filled porosity estimate may be calculated. Quality indicators may also be computed based on the calculated qualities, as described herein, at block 312.

The output of blocks 310 or 312 (optimal water salinity and final water-filled porosity along with the quality indicators) may then be returned to the user or stored in a readable medium. Calculated quantities may be used to derive further petrophysical quantities (such as water saturation and water resistivity) or may be used along with outputs from other tools, such as NMR or resistivity tools, in an integrated interpretation process. In either case (that is, whether the calculated quantities are used directly or go through further processing,) calculated quantities are used to make petrophysical decisions on the logged well or otherwise perform downhole operations.

Figures 4A, 4B, 4C, 4D:
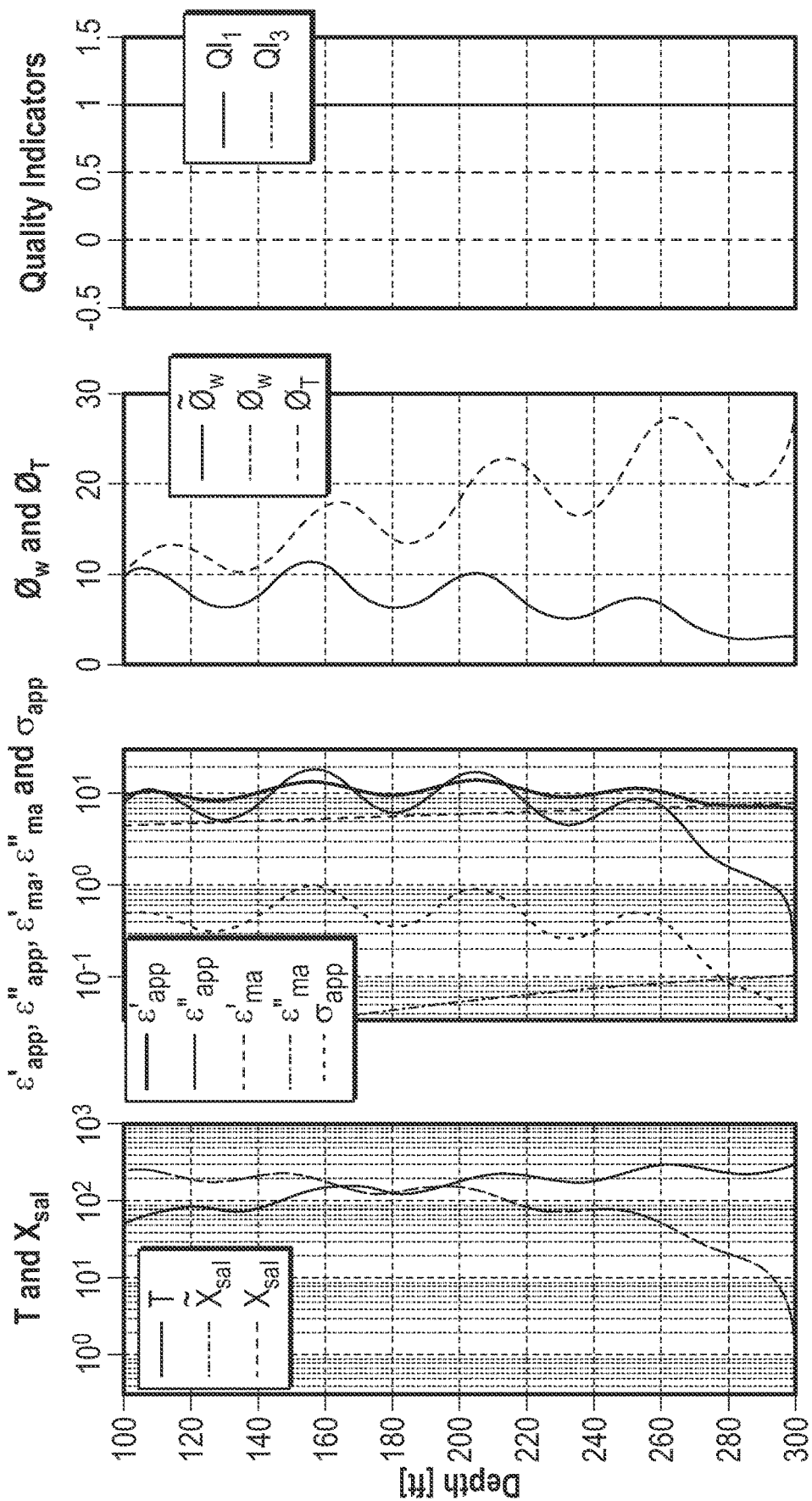
FIGS. 4a, b, c and d are graphs showing calculated apparent permittivity, water-filled porosity, water salinity and quality indicator results vs depth for a simulated log.

Illustrative simulation results will now be discussed to demonstrate the described methods. FIGS. 4a, b, c and d show calculated apparent permittivity, water-filled porosity, water salinity and quality indicator results vs depth for a simulated log. The CRIM mixing law was assumed, so no model parameters were needed to be inverted. FIG. 4a shows the temperature in Fahrenheits, true water salinity and the estimated water salinity values. In this example with no noise, almost perfect reconstruction of water salinity values was possible. In FIG. 4b, logs of real and imaginary parts of the apparent permittivity, real and imaginary parts of the permittivity of the rock matrix and the apparent conductivity are shown. FIG. 4c shows the logs of true and estimated water-filled porosity as well as true porosity. Again, true and estimated results show an almost perfect match. Finally, FIG. 4d shows the calculated quality indicators QI1 and QI3 as calculated in Equation 20 and Equation 22. As expected, quality indicators are almost exactly 1.

FIGS. 5a, b, c and d are results of FIG. 4 reproduced after an introduction of a 10% random error in temperature. FIG. 5a shows estimated $X_{Sal}$, true $X_{sal}$ and temperature vs depth. FIG. 5b shows real and imaginary parts of the apparent permittivity and matrix permittivity vs depth. FIG. 5c shows estimated $Ø_w$, true $Ø_w$, and $Ø_T$ vs depth. FIG. 5d shows the calculated quality indicators vs. depth. Results show that this method is resilient to errors with only a minor effect on $X_{sal}$ being observed.

Figures 6A, 6B, 6C, 6D:
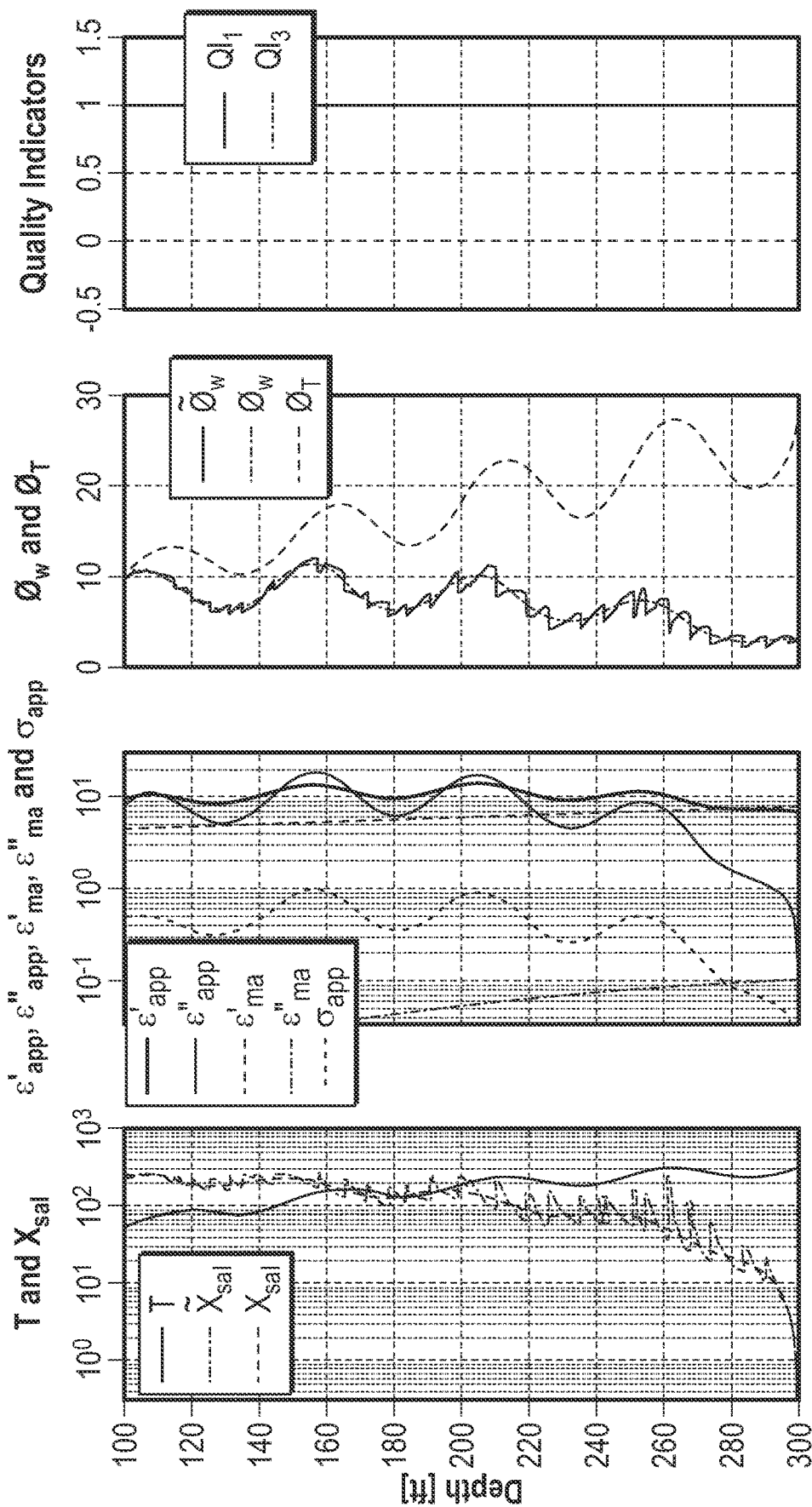
FIGS. 6a, b, c and d are the results of FIG. 4 with a 5% random error introduced to the real and imaginary parts of the permittivity of the rock matrix.

FIGS. 6a, b, c and d are the results of FIG. 4 with a 5% random error introduced to the real and imaginary parts of the permittivity of the rock matrix. FIG. 6a shows the estimated $X_{sal}$, true $X_{sal}$ and temperature vs depth. FIG. 6b shows the real and imaginary parts of the apparent permittivity and matrix permittivity vs depth. FIG. 6c shows the estimated $Ø_w$, true $Ø_w$, and $Ø_T$ vs depth. FIG. 6d shows quality indicators $QI_1$ and $QI_3$ vs depth. Although results are more sensitive to the errors in permittivity vs temperature, estimated results remain robust to the errors and overall a good match with the true values are obtained.

In further alternate embodiments, the dielectric tool may be a multi-frequency tool. In such an example, three separate water-filled porosity estimates may be obtained for each frequency. Thus, this proposed technique may be extended to include all the available water-filled porosity estimates. For example, if the tool operates at two distinct frequencies, a total of six water-filled porosity estimates may be obtained. In that case, equations, such as Equation 17, may be modified to include the additional water-filled porosity estimates.

Similarly, an alternative method uses only two water-filled porosity estimates out of the 3 described herein for processing. Such an embodiment may be for making the calculations easier or due to a water-filled porosity estimate deemed to be more prone to noise.

In yet another embodiment, $QI_3$ may be used to test different water-filled porosity estimates to determine the best estimate. This best estimate may be returned as the final water-filled porosity estimate.

In other embodiments, the dielectric tool may be an LWD tool. In that case, due to the rotation of the tool, an image of the water-filled porosity and water salinity (with respect to depth and azimuth angle of the tool) may be obtained. An image may also be obtained with a wireline tool if the tool has multiple electrodes sets around the circumference of the tool. For example, the tool may contain multiple pads. Each pad may have a set of transmitter/receiver electrodes on them. Such an image would be useful to understand the variation of the parameters of interest around the borehole (e.g., hydrocarbon-bearing formation) and to make textural/stratigraphical analysis.

In certain other embodiments, different mixing laws with different parameters may be used in the solution. Out of these different mixing laws, the mixing law that produces the highest quality (or the lowest misfit) may be selected as the best mixing law. In a variation of the above embodiments, different mixing laws may only be applied if the applied mixing law has low quality. Further filtering may be applied in those instances as well. In a similar embodiment, filtering may only be applied if the initial processing indicates low quality.

Figure 7:
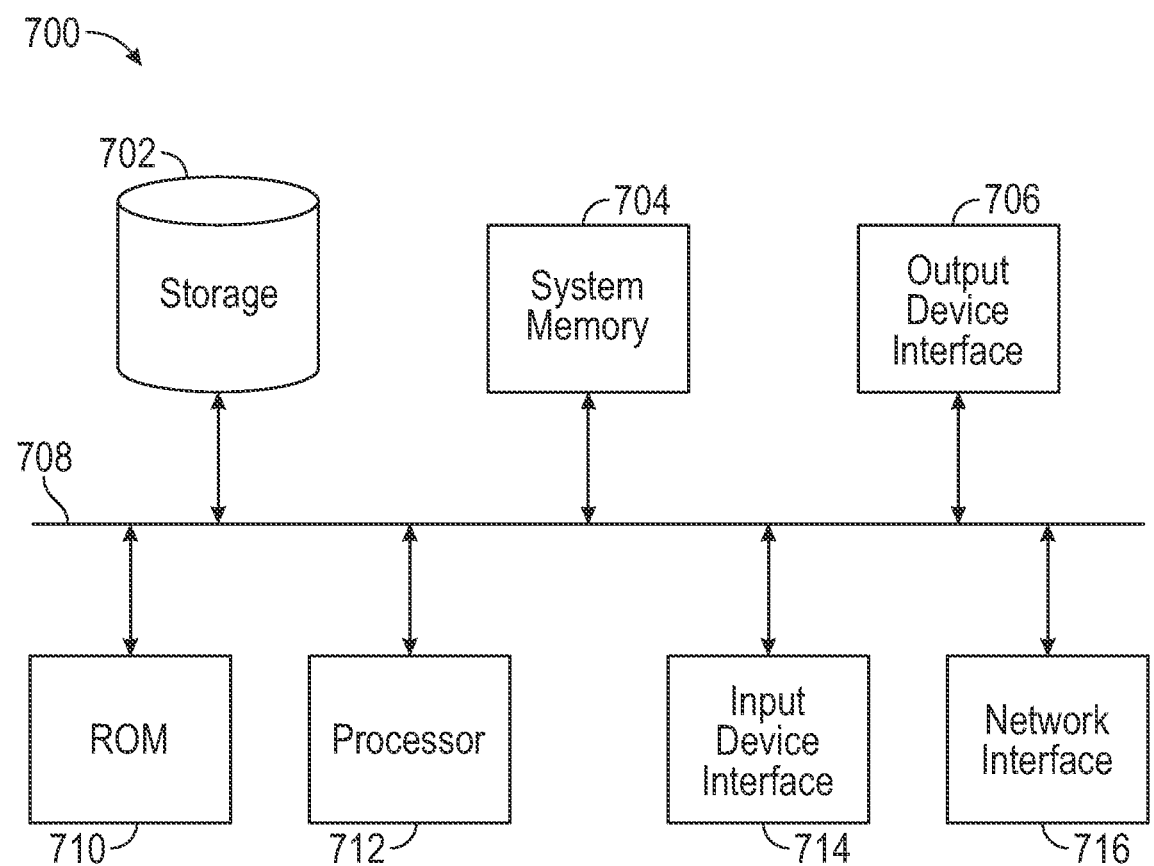
FIG. 7 is a block diagram of an exemplary computer system 700 in which embodiments of the present disclosure may be implemented.

FIG. 7 is a block diagram of an exemplary computer system 700 in which embodiments of the present disclosure may be implemented. System 700 can be a computer, phone, PDA, or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 610. For example, the various memory units include instructions for computer aided pipe string design based on existing string designs in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the system 700. Input devices used with input device interface 714 include, for example, alphanumeric, QWERTY, or T9 keyboards, microphones, and pointing devices (also called "cursor control devices"). Output device interfaces 706 enables, for example, the display of images generated by the system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network ("LAN"), such as an Intranet, or a wide area network ("WAN"), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes described above may be implemented using system 600 or any computer system having processing circuitry or a computer program product including instructions stored therein, which, when executed by at least one processor, causes the processor to perform functions relating to these methods.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, illustrative embodiments of the present disclosure provide novel methods for determining water-filled porosity using a general volumetric mixing law and the measurements of a dielectric tool. The water-filled porosity estimates are also used to obtain water salinity estimates and the optimal parameters of the volumetric mixing law. These estimates are in turn used to generate novel quality indicators.

Embodiments and methods of the present disclosure described herein further relate to any one or more of the following paragraphs:

1. A method to determine parameters of a volumetric mixing law and water salinity using complex measurements obtained by a downhole dielectric tool, the method comprising: calculating, using real measurements obtained by the dielectric tool, a first estimate of water-filled porosity; calculating, using imaginary measurements obtained by the dielectric tool, a second estimate of water-filled porosity; calculating, using complex measurements obtained by the dielectric tool, a third estimate of water-filled porosity; and calculating values of the volumetric mixing law parameters and water salinity that minimize a difference between at least two of the first, second or third estimates of water-filled porosity, thereby resulting in an optimal water salinity and volumetric mixing law parameters.
2. The method as defined in paragraph 1, further comprising using the optimal water salinity and volumetric mixing law parameters to determine a final estimate of the water-filled porosity; and performing a downhole operation based upon the final estimate of the water-filled porosity.
3. The method as defined in paragraph 1 or 2, further comprising calculating a final estimate of water-filled porosity based on a fit of the volumetric mixing law to at least one of the real, imaginary or complex measurements using the optimal water salinity and volumetric mixing law parameters; or calculating a final estimate of the water-filled porosity based on a weighted average of at least two of the first, second or third estimates of the water-filled porosity.
4. The method as defined in any of paragraphs 1-3, further comprising determining a quality indicator based upon a fit of the real, imaginary or complex measurements to the volumetric mixing law using the final estimate of water-filled porosity and the optimal water salinity.
5. The method as defined in any of paragraphs 1-4, wherein the dielectric tool is a multi-frequency tool; and more than three water-filled porosity estimates are applied to calculate the optimal water salinity and volumetric mixing law parameters.
6. The method as defined in any of paragraphs 1-5, further comprising generating an image of a hydrocarbon-bearing formation using the optimal water salinity and volumetric mixing parameters.
7. The method as defined in any of paragraphs 1-6, further comprising determining a quality indicator based upon a normalized difference between the first, second and third estimates of the water-filled porosity.
8. The method as defined in any of paragraphs 1-7, further comprising determining a quality indicator by: equating the obtained dielectric tool measurements to different models for permittivity of water or refractive index of water to obtain different water salinity estimates; comparing the water salinity estimates; and determining a quality of the different water salinity estimates based upon a deviation of the different water salinity estimates from a mean.
9. The method as defined in any of paragraphs 1-8, further comprising determining a plurality of quality indicators for the water-filled porosity estimates, the quality indicators being determined using different methods; determining a total quality indicator based upon a weighted average of the quality indicators.
10. A system to determine parameters of a volumetric mixing law and water salinity using complex measurements obtained by a downhole dielectric tool, the system comprising a dielectric tool; and processing circuitry communicably coupled to the dielectric tool to perform operations comprising: calculating, using real measurements obtained by the dielectric tool, a first estimate of water-filled porosity; calculating, using imaginary measurements obtained by the dielectric tool, a second estimate of water-filled porosity; calculating, using complex measurements obtained by the dielectric tool, a third estimate of water-filled porosity; and calculating values of the volumetric mixing law parameters and water salinity that minimize a difference between at least two of the first, second or third estimates of water-filled porosity, thereby resulting in an optimal water salinity and volumetric mixing law parameters.
11. The system as defined in paragraph 10, further comprising using the optimal water salinity and volumetric mixing law parameters to determine a final estimate of the water-filled porosity; and performing a downhole operation based upon the final estimate of the water-filled porosity.
12. The system as defined in paragraphs 10 or 11, further comprising calculating a final estimate of water-filled porosity based on a fit of the volumetric mixing law to at least one of the real, imaginary or complex measurements using the optimal water salinity and volumetric mixing law parameters; or calculating a final estimate of the water-filled porosity based on a weighted average of at least two of the first, second or third estimates of the water-filled porosity.
13. The system as defined in any of paragraphs 10-12, further comprising determining a quality indicator based upon a fit of the real, imaginary or complex measurements to the volumetric mixing law using the final estimate of water-filled porosity and the optimal water salinity.
14. The system as defined in any of paragraphs 10-13, wherein the dielectric tool is a multi-frequency tool; and more than three water-filled porosity estimates are applied to calculate the optimal water salinity and volumetric mixing law parameters.
15. The system as defined in any of paragraphs 10-14, further comprising generating an image of a hydrocarbon-bearing formation using the optimal water salinity and volumetric mixing parameters.
16. The system as defined in any of paragraphs 10-15, further comprising determining a quality indicator based upon a normalized difference between the first, second and third estimates of the water-filled porosity.
17. The system as defined in any of paragraphs 10-16, further comprising determining a quality indicator by equating the obtained dielectric tool measurements to different models for permittivity of water or refractive index of water to obtain different water salinity estimates; comparing the water salinity estimates; and determining a quality of the different water salinity estimates based upon a deviation of the different water salinity estimates from a mean.

18. The system as defined in any of paragraphs 10-17, further comprising determining a plurality of quality indicators for the water-filled porosity estimates, the quality indicators being determined using different methods; determining a total quality indicator based upon a weighted average of the quality indicators.

Furthermore, the exemplary methodologies described herein may be implemented by a system including processing circuitry or a non-transitory computer program product including instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A method to determine parameters of a volumetric mixing law and water salinity using complex measurements obtained by a downhole dielectric tool, the method comprising:
    calculating, using real measurements obtained by the dielectric tool, a first estimate of water-filled porosity;
    calculating, using imaginary measurements obtained by the dielectric tool, a second estimate of water-filled porosity;
    calculating, using complex measurements obtained by the dielectric tool, a third estimate of water-filled porosity;
    calculating values of the volumetric mixing law parameters and water salinity that minimize a difference between at least two of the first, second, or third estimates of water-filled porosity, thereby resulting in an optimal water salinity and volumetric mixing law parameters;
    using the optimal water salinity and volumetric mixing law parameters to determine a final estimate of the water-filled porosity; and
    performing a downhole operation based upon the final estimate of the water-filled porosity.

2. The method as defined in claim 1, further comprising:
    calculating a final estimate of water-filled porosity based on a fit of the volumetric mixing law to at least one of the real, imaginary, or complex measurements using the optimal water salinity and volumetric mixing law parameters; or
    calculating a final estimate of the water-filled porosity based on a weighted average of at least two of the first, second, or third estimates of the water-filled porosity.

3. The method as defined in claim 2, further comprising determining a quality indicator based upon a fit of the real, imaginary, or complex measurements to the volumetric mixing law using the final estimate of water-filled porosity and the optimal water salinity.

4. The method as defined in claim 1, wherein the dielectric tool is a multi-frequency tool and wherein more than three water-filled porosity estimates are applied to calculate the optimal water salinity and volumetric mixing law parameters.

5. The method as defined in claim 1, further comprising generating an image of a hydrocarbon-bearing formation using the optimal water salinity and volumetric mixing parameters.

6. The method as defined in claim 1, further comprising determining a quality indicator based upon a normalized difference between the first, second, and third estimates of the water-filled porosity.

7. The method as defined in claim 1, further comprising determining a quality indicator by:
    equating the obtained dielectric tool measurements to different models for permittivity of water or refractive index of water to obtain different water salinity estimates;
    comparing the water salinity estimates; and
    determining a quality of the different water salinity estimates based upon a deviation of the different water salinity estimates from a mean.

8. The method as defined in claim 1, further comprising:
    determining a plurality of quality indicators for the water-filled porosity estimates, the quality indicators being determined using different methods; and
    determining a total quality indicator based upon a weighted average of the quality indicators.

9. A system to determine parameters of a volumetric mixing law and water salinity using complex measurements obtained by a downhole dielectric tool, the system comprising:
    a dielectric tool; and
    processing circuitry communicably coupled to the dielectric tool to perform operations comprising:
        calculating, using real measurements obtained by the dielectric tool, a first estimate of water-filled porosity;
        calculating, using imaginary measurements obtained by the dielectric tool, a second estimate of water-filled porosity;
        calculating, using complex measurements obtained by the dielectric tool, a third estimate of water-filled porosity;
        calculating values of the volumetric mixing law parameters and water salinity that minimize a difference between at least two of the first, second, or third estimates of water-filled porosity, thereby resulting in an optimal water salinity and volumetric mixing law parameters;
        using the optimal water salinity and volumetric mixing law parameters to determine a final estimate of the water-filled porosity; and
        performing a downhole operation based upon the final estimate of the water-filled porosity.

10. The system as defined in claim 9, further comprising:
    calculating a final estimate of water-filled porosity based on a fit of the volumetric mixing law to at least one of the real, imaginary, or complex measurements using the optimal water salinity and volumetric mixing law parameters.

11. The system as defined in claim 10, further comprising determining a quality indicator based upon a fit of the real, imaginary, or complex measurements to the volumetric mixing law using the final estimate of water-filled porosity and the optimal water salinity.

12. The system as defined in claim 9, wherein:
    the dielectric tool is a multi-frequency tool; and more than three water-filled porosity estimates are applied to calculate the optimal water salinity and volumetric mixing law parameters.

13. The system as defined in claim 9, further comprising generating an image of a hydrocarbon-bearing formation using the optimal water salinity and volumetric mixing parameters.

14. The system as defined in claim 9, further comprising determining a quality indicator based upon a normalized difference between the first, second and third estimates of the water-filled porosity.

15. The system as defined in claim 9, further comprising determining a quality indicator comprising:
   equating the obtained dielectric tool measurements to different models for permittivity of water or refractive index of water to obtain different water salinity estimates;
   comparing the water salinity estimates; and
   determining a quality of the different water salinity estimates based upon a deviation of the different water salinity estimates from a mean.

16. The system as defined in claim 9, further comprising:
   determining a plurality of quality indicators for the water-filled porosity estimates, the quality indicators being determined using different methods;
   determining a total quality indicator based upon a weighted average of the quality indicators.

17. The system as defined in claim 9, further comprising:
   calculating a final estimate of the water filled porosity based on a weighted average of at least two or the first, second, or third estimates of the water filled porosity.

* * * * *